US006644174B2

(12) United States Patent  
Sakurazawa (10) Patent No.: US 6,644,174 B2
(45) Date of Patent: Nov. 11, 2003

(54) NOODLE GELATING DEVICE (75) Inventor: Hatsuo Sakurazawa, Takasaki (JP)

(73) Assignee: Fuji Manufacturing Corporation Ltd. (JP)

( * ) Notice: Subject to any disclaimer, the term of this patent is extended or adjusted under 35 U.S.C. 154(b) by 0 days.

(21) Appl. No.: 10/333,764

(22) PCT Filed: Jun. 19, 2001

(86) PCT No.: PCT/JP01/05228

§ 371 (c)(1),
(2), (4) Date: Jan. 22, 2003

(87) PCT Pub. No.: WO02/11559

PCT Pub. Date: Feb. 14, 2002

(65) Prior Publication Data

US 2003/0134020 A1 Jul. 17, 2003

(30) Foreign Application Priority Data

Mar. 8, 2000 (JP) ......................................... 2000-235076

(51) Int. Cl.[7] .......................... A23L 1/16; A47J 27/10; A47J 27/14; A47J 27/16; A47J 37/12
(52) U.S. Cl. ............................. 99/330; 99/403; 99/404; 99/407; 99/409
(58) Field of Search ................... 99/326–331, 352–355, 99/403–410, 427, 443 R, 443 C, 484, 485; 126/391.1, 369; 219/401, 388

(56) References Cited

U.S. PATENT DOCUMENTS

| 4,228,730 A | * | 10/1980 | Schindler et al. | ........ 126/391 X |
| 4,269,113 A | * | 5/1981 | Ishida | .......................... 99/404 |
| 4,685,386 A | * | 8/1987 | Bezon | ...................... 99/443 C |
| 4,694,742 A | * | 9/1987 | Dover | ......................... 99/407 |
| 4,732,080 A | * | 3/1988 | Vita | ............................. 99/330 |
| 4,979,435 A | * | 12/1990 | Hayashi et al. | ................ 99/334 |
| 5,018,438 A | * | 5/1991 | Grandi | ......................... 99/335 |
| 5,142,968 A | * | 9/1992 | Caron et al. | .............. 99/409 X |
| 5,228,382 A | * | 7/1993 | Hayashi et al. | ................ 99/328 |
| 5,322,006 A | * | 6/1994 | Morioka et al. | .............. 99/405 |
| 5,799,568 A | * | 9/1998 | Warren et al. | ............ 99/330 X |

FOREIGN PATENT DOCUMENTS

| JP | 52-3428 Y1 | 1/1977 |
| JP | 52-87280 A | 7/1977 |
| JP | 52-114063 A | 9/1977 |
| JP | 3-247248 A | 11/1991 |

OTHER PUBLICATIONS

International Search Report; PCT/JP01/05228; dated Jul. 24, 2001.

* cited by examiner

Primary Examiner—Timothy F. Simone
(74) Attorney, Agent, or Firm—Young & Basile, P.C.

(57) ABSTRACT

The noodle gelatinization apparatus holds a plurality of baskets (32) by hanging both their ends on hangers (38) connected to a chain conveyor rollers placed at designated intervals, lays the delivery lane of the chain conveyor in a steam chamber (26) where steam is supplied from its lower part, and passes the baskets through the steam chamber after loading them with noodle strings near an entrance (26a) to the steam chamber. According to the present invention, each of the baskets is a box-shaped body partitioned into a plurality of container compartments with a large number of holes such that each container compartment is capable of containing one serving of noodle strings. Also, hanger support rails are installed spanning between an entrance side and an exit side of the steam chamber. Besides, the basket entering the steam chamber from the entrance side moves toward the exit side (26b), being pushed by the succeeding baskets.

3 Claims, 7 Drawing Sheets

NOODLE GELATING DEVICE

BACKGROUND OF THE INVENTION

1. Field of the Invention

The present invention relates to a noodle gelatinization apparatus.

2. Description of the Related Art

A known manufacturing method of instant noodles involves putting wheat flour, buckwheat flour, starch, and other raw materials into a kneading machine such as a mixer, adding mixing water prepared in advance, and kneading the mixture for a designated time. Then, dough (noodle dough) taken out of the kneading machine is rolled into a designated thickness on a rolling mill, cut into designated lengths on a noodle cutter, and passed through a wave box to form wavy noodle strips. The noodle strings are sent to a gelatinization apparatus, steamed in the steam atmosphere of the gelatinization apparatus for a designated time, and conveyed to a frying apparatus or hot air apparatus for a drying process.

Figure 8:
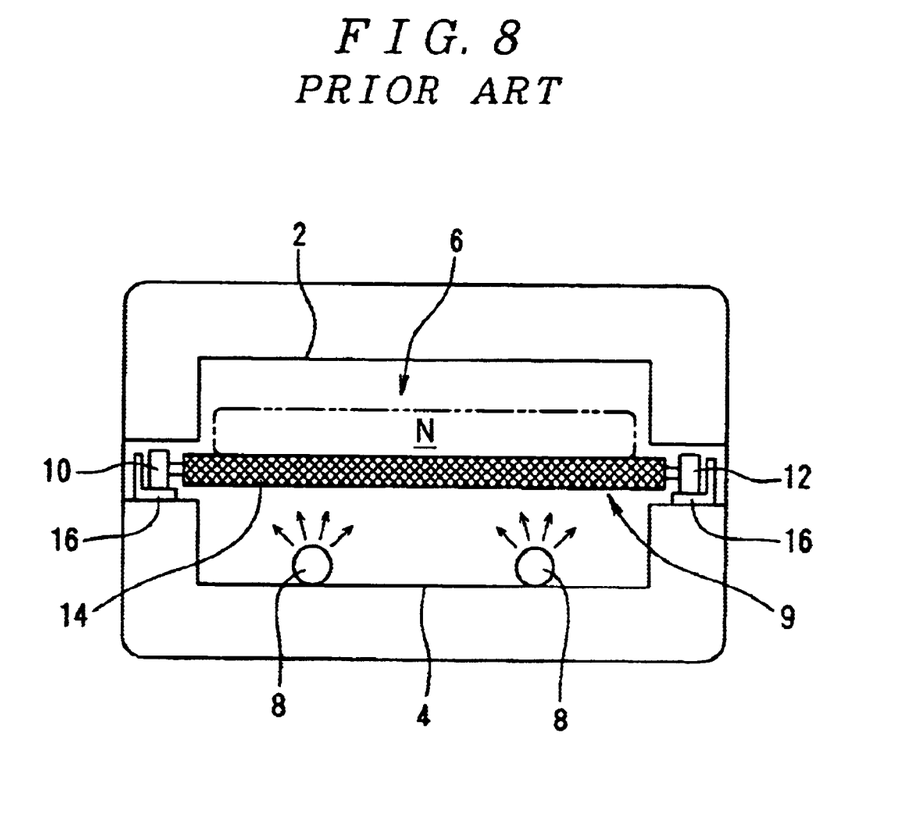
FIG. 8 is a sectional view showing a conventional noodle gelatinization apparatus.

FIG. 8 is a sectional view showing an internal structure of a conventional gelatinization apparatus. In this apparatus, a delivery lane of a net conveyor 9 runs in an inner space 6 formed by an upper cover 2 and lower cover 4 and extending horizontally and steam is supplied upward from steam pipes 8 installed on the lower cover 4 to use the inner space 6 as a steam chamber 6.

The above described net conveyor 9 comprises two endless roller chains 10 and 12 placed parallel to each other, a net 14 stretched between the roller chains 10 and 12, rails 16 which are placed at the lateral ends of the upper cover 2 and lower cover 4 and which turn the rollers of the roller chains 10 and 12, and drive sprockets (not shown) for driving the roller chains 10 and 12.

The net 14 on the delivery lane passes through the steam chamber 6 at a designated conveying speed to allow the noodle strings N placed on the net 14 to be steamed in a steaming process.

With a conventional gelatinization apparatus, which continuously supply noodle strings N cut into designated lengths to the net 14 of the net conveyor 9, the noodle strings N are lined up in an orderly manner on the net 14, increasing the contact areas between individual noodle strings N. Therefore, the steam supplied from the steam pipes 8 to the steam chamber 6 does not spread all over the noodle strings N on the net 14.

Consequently, measures are taken to bring steam into contact with every part of the noodle strings N on the net 14, including measures to increase the density of the mist in the steam chamber 6 by increasing the amount of steam supplied from the steam pipes 8 so that steam will spread all over the noodle strings N, measures to lower the conveying speed of the net 14, and measures to increase the length of the steaming process line.

However, a large steaming process time or requirement for a great amount of steam will pose a problem in terms of running costs. Besides, extension of the steaming process line involves extension of the noodle production line, posing a problem in terms of equipment costs.

Then, the present invention has been achieved in view of the above problems. Its object is to provide a noodle gelatinization apparatus that can complete the steaming process of noodle strings in a short period of time while reducing the running costs and equipment costs.

SUMMARY OF THE INVENTION

The noodle gelatinization apparatus holds a plurality of baskets in such a way that the baskets can swing freely, by hanging both their ends on the hangers on the chain conveyor rollers placed at designated intervals, lays the delivery lane of the above described chain conveyor in a steam chamber where steam is supplied from its lower part, and passes the baskets through the steam chamber after loading them with noodle strings near the entrance side of the above described steam chamber, to run a steaming process of the above described noodle strings, in which each of the above described baskets is a box-shaped body partitioned into a plurality of container compartments with a large number of holes, and each container compartment is capable of containing one serving of the above described noodle strings, and hanger support rails are installed spanning between the entrance side and exit side of the above described steam chamber, and the basket entering the above described steam chamber from the entrance side moves toward the exit side, being pushed by the succeeding baskets and the hangers at both ends being supported by the above described hanger support rails from below, with the chains along the above described delivery lane which are connected to the above described hangers sagging below. The delivery lane of the above described chain conveyor winds up and down from the above described entrance side to the above described exit side within the above described steam chamber.

Also, the noodle gelatinization apparatus holds a plurality of baskets by hanging both their ends on the hangers on the chain conveyor rollers placed at designated intervals, lays the delivery lane of the above described chain conveyor in a steam chamber where steam is supplied from its lower part, and passes the baskets through the steam chamber after loading them with noodle strings near the entrance side of the above described steam chamber, to run a steaming process of the above described noodle strings, in which each of the above described baskets is a box-shaped body partitioned into a plurality of container compartments with a large number of holes, and each container compartment is capable of containing one serving of the above described noodle strings, and hanger support rails are installed spanning between the entrance side and exit side of the above described steam chamber, and the basket entering the above described steam chamber from the entrance side moves toward the exit side, being pushed by the succeeding baskets and being supported at both ends by the above described hanger support rails from below, with the chains along the above described delivery lane which are connected to the above described baskets sagging below.

DETAILED DESCRIPTION OF THE PREFERRED EMBODIMENTS

A noodle gelatinization apparatus according to the present invention will be described below with reference to drawings.

Figure 1:
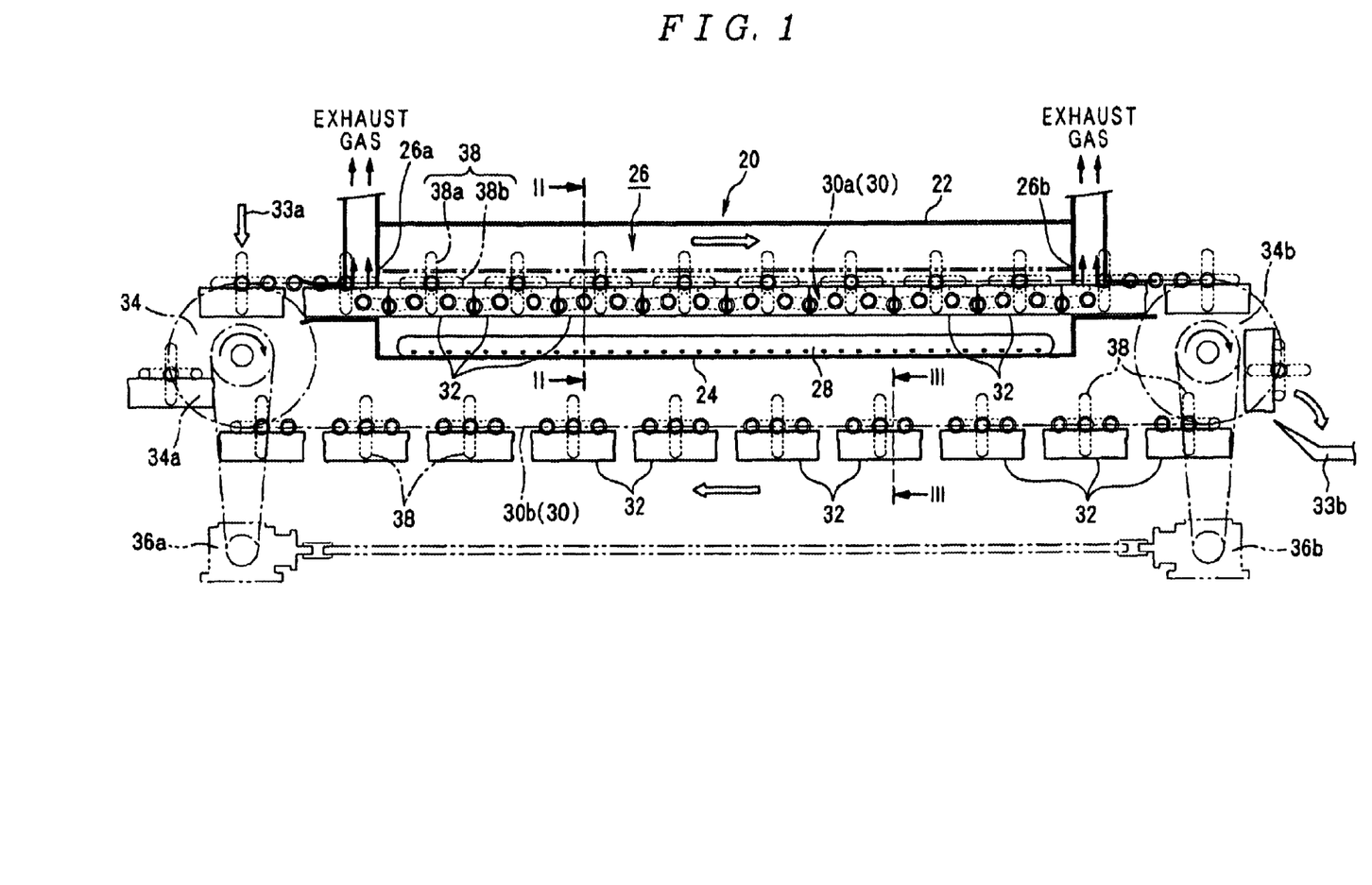
FIG. 1 is a block diagram showing a noodle gelatinization apparatus according to the present invention.
Figure 2:
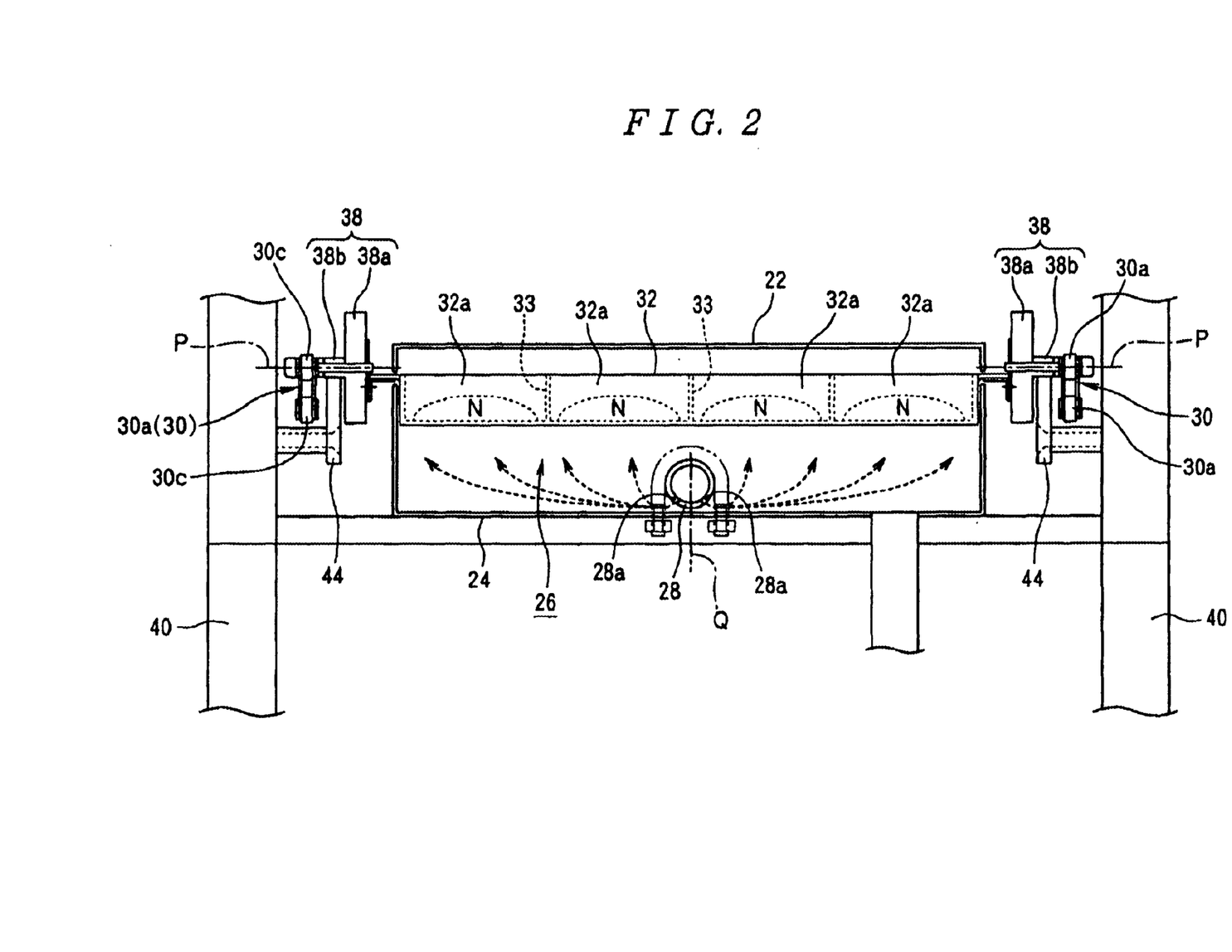
FIG. 2 is a II—II line view of the noodle gelatinization apparatus.
Figure 3:
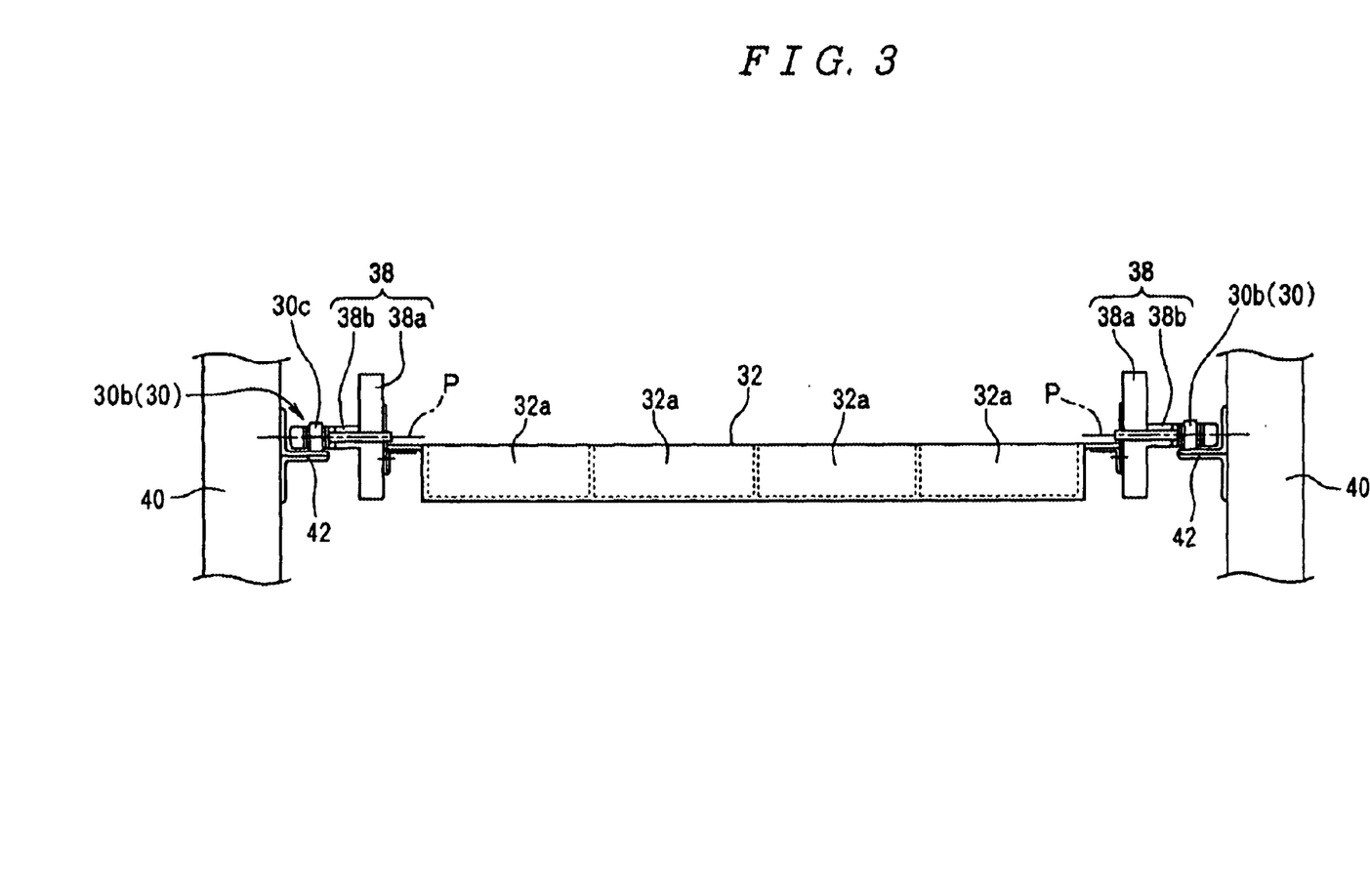
FIG. 3 is a III—III line view of the noodle gelatinization apparatus.

FIG. 1 shows a first embodiment of an instant-noodle gelatinization apparatus. FIG. 2 is a II—II line view of FIG. 1 while FIG. 3 is a III—III line view of FIG. 1.

As shown in FIG. 1, a gelatinization apparatus 20 according to this embodiment is a flat apparatus (end stage) which comprises an accessory compartment 26 formed by an upper cover 22 and a lower cover 24 and extending horizontally, supplies high-temperature steam to it from a steam pipe 28 installed on the lower cover 24 to use it as a steam chamber (hereafter referred to as the steam chamber 26), puts noodle strings in a plurality of baskets 32 connected to a chain conveyor 30, conveys them from an entrance side 26a to an exit side 26b of the steam chamber 26 to run a steaming process of the noodles.

As shown in FIG. 2, the above described steam pipe 28 has steam outlets 28a facing downward (toward the lower cover 24). More particularly, steam outlets 28a have been installed at an angle of 15 degrees to the plumb line Q.

As shown in FIG. 2, each basket 32 is a rectangular box partitioned longitudinally by divider plates 33 into a plurality of noodle-container compartments 32a with a large number of holes in the bottom. Each basket 32 is hung and held on the chain conveyor 30 at designated intervals by means of hangers 38 connected to both longitudinal ends of the basket. The hanger 38 is an integrally formed cross-shaped member comprising a vertical support 38a located on the side of the basket 32 and extending vertically and a horizontal support 38b located away from the basket 32 and extending horizontally (see FIG. 1).

And, as shown in FIGS. 2 and 3, the roller 30c of the chain conveyor 30 is coaxially connected to the connection point P which the vertical support 38a intersects the horizontal support 38b. Thus, the basket 32 is connected to the chain conveyor 30, the connection point P being the center of the connection, via the hanger 38 in such a way that the basket 32 can swing freely.

As shown in FIG. 1, the chain conveyor 30 is mounted on a pair of sprockets 34a and 34b installed outside the entrance side and exit side of the steam chamber 26, with the chains passing through the steam chamber 26 and returning from outside the steam chamber 26. The chains passing through the steam chamber 26 are referred to herein as the delivery chain segments 30a and the chains traveling outside the steam chamber 26 are referred to as the return chain segments 30b. The chain conveyor 30 carries the baskets as rotary driving forces in the direction of the arrow are transmitted to the sprockets 34 by drive motors 36a and 36b.

The member denoted by reference numeral 40 in FIGS. 2 and 3 is an equipment frame 40 located on the lateral sides of the upper cover 22 and lower cover 24. As shown in FIG. 3, on the equipment frame 40 near the sides of the return chain segments 30b, chain support rails 42 supporting the rollers 30c in the return chain segments 30b from below are laid along the traveling direction (horizontal direction) of the return chain segments 30b.

Also, as shown in FIG. 2, on the equipment frame 40 near the sides of the delivery chain segments 30a, hanger support rails 44 supporting the horizontal supports 38b of the hangers 38 from below are laid along the traveling direction (horizontal direction) of the delivery chain segments 30a.

Figure 4:
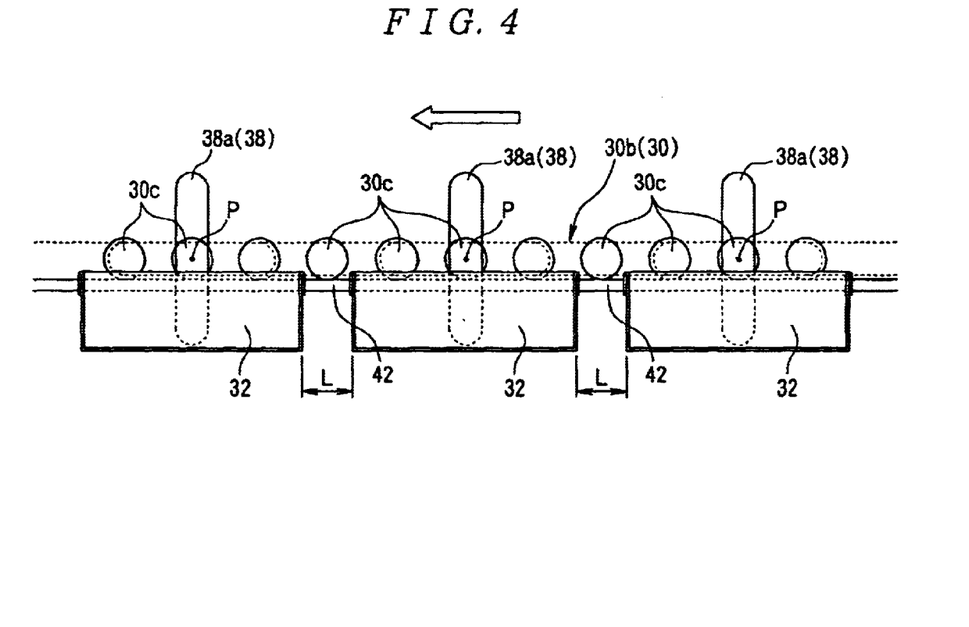
FIG. 4 is a drawing showing a chain conveyor along a delivery lane which supports baskets of the noodle gelatinization apparatus of the present invention.

Now, the operation of the gelatinization apparatus 20 with the above configuration will be described. Since all the rollers 30c in the return chain segments 30b roll on, being supported from below by the chain support rails 42, they extend linearly on the chain support rails 42 as shown in FIG. 4, and empty baskets 32 are carried at designated intervals L toward the noodle supply port 33a near the entrance side 26a of the steam chamber 26.

Noodle strings are supplied from the noodle supply port 33a to the container compartments 32a in the basket 32 that comes under the noodle supply port 33a and the basket 32 moves further toward the entrance side 26a of the steam chamber 26.

Figure 5:
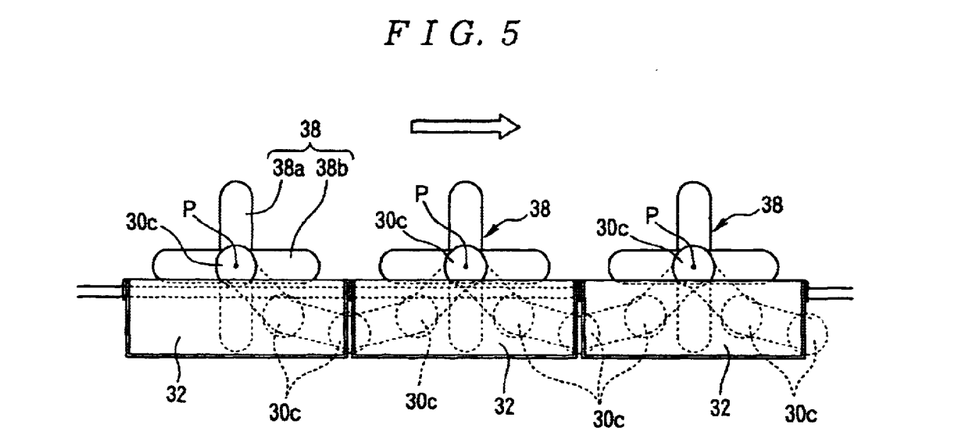
FIG. 5 is a drawing showing how the baskets move in the steam chamber of the noodle gelatinization apparatus according to the present invention.

When the basket 32 containing noodle strings is carried into the steam chamber 26 by the delivery chain segments 30a, not all the rollers 30c are supported by the support rails 44, and the horizontal supports 38b of the hangers 38 are supported from below by the hanger support rails 44. Consequently, as shown in FIG. 5, the rollers 30c other than the roller 30c connected to the hangers 38 sag below, decreasing the conveying speed of the baskets 32 in the steam chamber 26.

The baskets 32 in the steam chamber 26 move toward the exit side 26b of the steam chamber 26, being pushed by the baskets 32 carried into the steam chamber 26 one by one. Consequently, as shown in FIG. 5, the baskets 32 in the steam chamber 26 are carried one behind another without a gap between adjacent baskets 32.

After traveling in the steam chamber 26 for a designated time and when traveling around the sprocket 34b, the baskets 32 tilts to unload the noodle strings from the container compartments 32a into a noodle unload station 33b.

According to the gelatinization apparatus 20 with the above configuration, since the baskets 32 in the steam chamber 26 are carried one behind another without a gap between adjacent baskets 32, the steam supplied from the lower part of the steam chamber 26 passes through the bottom of each basket 32 and moves upward, coming into contact with the entire surfaces of the noodle strings N.

Consequently, the noodle strings N can be steamed perfectly without increasing the amount of steam supplied from the steam pipe 28, lowering the conveying speed of the chain conveyor 30, or increasing the length of the steaming process line. This reduces the steaming process time and suppresses steam consumption, resulting in low running and equipment costs.

Also, since one serving of noodle strings N each is contained in the container compartments 32a of the baskets 32, the contact areas between individual noodle strings N are reduced, making it easier for steam to contact the noodle strings N. Consequently, the steaming process can be performed at a high level of quality in a short period of time.

Figure 6:
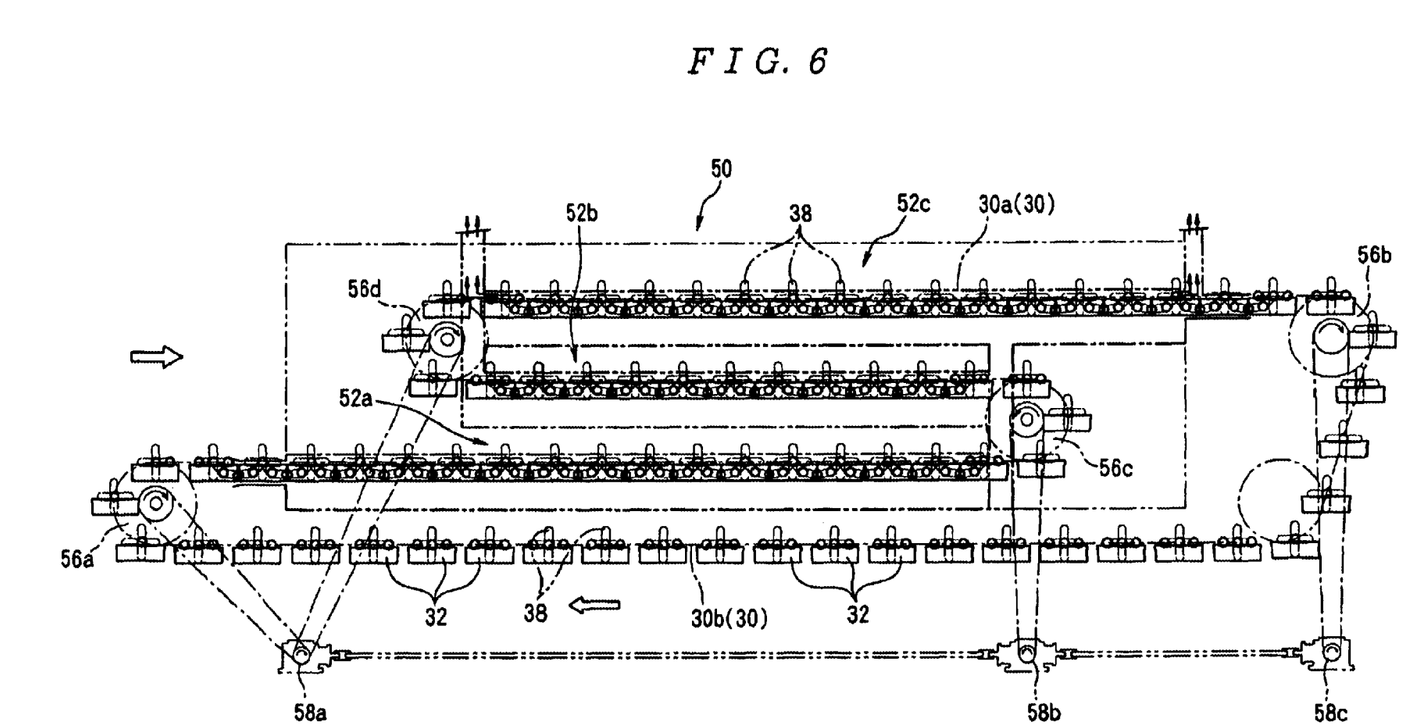
FIG. 6 is a block diagram showing the noodle gelatinization apparatus according to a second embodiment.

FIG. 6 shows the instant-noodle gelatinization apparatus according to a second embodiment. In this figure, the same components as those of the first embodiment are denoted by the same reference numerals and description thereof are omitted.

The gelatinization apparatus 50 according to this embodiment is a multi-tier apparatus which comprises a lower steam chamber 52a, middle steam chamber 52b, and upper steam chamber 52c connected with each other by a plurality of upper and lower covers not shown.

A steam atmosphere is created in the steam chambers, 52a, 52b, and 52c by the high-temperature steam delivered from the steampipes installed on the lower covers of the steam chambers, 52a, 52b, and 52c.

This apparatus performs a steaming process by passing noodle strings placed in a plurality of baskets 32 connected to the chain conveyor 30, through the lower steam chamber 52a, middle steam chamber 52b, and upper steam chamber 52c.

The baskets 32, which have the same configuration as do those of the first embodiment, are supported and held at designated intervals on the chain conveyor 30 through the hangers 38 connected to both longitudinal ends of the baskets.

The chain conveyor 30 is supported by the sprocket 56a installed outside the entrance side of the lower steam chamber 52a, sprocket 56b installed at the exit side of the upper steam chamber 52c, sprocket 56c installed between the exit side of the lower steam chamber 52a and the entrance side of the middle steam chamber 52b and sprocket 56d installed between the exit side of the middle steam chamber 52b and the upper steam chamber 52c. The chains have been configured to pass through the lower, middle, and upper steam chambers 52a, 52b, and 52c and then take return paths outside the chambers. The chains passing through the lower, middle, or upper steam chamber 52a, 52b, or 52c are referred to herein as the delivery chain segments 30a and the chains traveling outside the steam chambers are referred to as the return chain segments 30b. This chain conveyor 30 also carries the baskets 32 as rotary driving forces in the direction of the arrow are transmitted to the sprockets 56a to 56d by drive motors 58a, 58b, and 58c.

Besides, on the equipment frame near the sides of the delivery chain segments 30a, hanger support rails supporting, from below, the hangers 38 connected to both ends of the baskets 32 are laid along the traveling direction (horizontal direction) of the delivery chain segments 30a although they are not shown in the figure.

Also in case of the gelatinization apparatus 50 with the above configuration, the baskets 32 in the lower, middle, and upper steam chambers 52a, 52b, and 52c are carried one behind another without a gap between adjacent baskets 32 and the steam supplied from the lower part of the steam chambers 52a, 52b, and 52c passes through the bottom of each basket 32 and moves upward, coming into contact with the entire surfaces of the noodle strings N. Consequently, the noodle strings N can be steamed perfectly without increasing the amount of steam supplied from the steam pipe, lowering the conveying speed of the chain conveyor 30. This reduces the steaming process time and suppresses steam consumption, resulting in low running and equipment costs.

Also, since the employment of the lower, middle, and upper steam chambers 52a, 52b, and 52c provides a long steaming process line in a limited space, this embodiment can perform the steaming process of noodle strings at a high level of quality. For example, by providing the lower, middle and upper steam chambers 52a, 52b, and 52c vertically, the steam moving upward is used effectively and the steaming process in a limited space can be performed.

Figure 7:
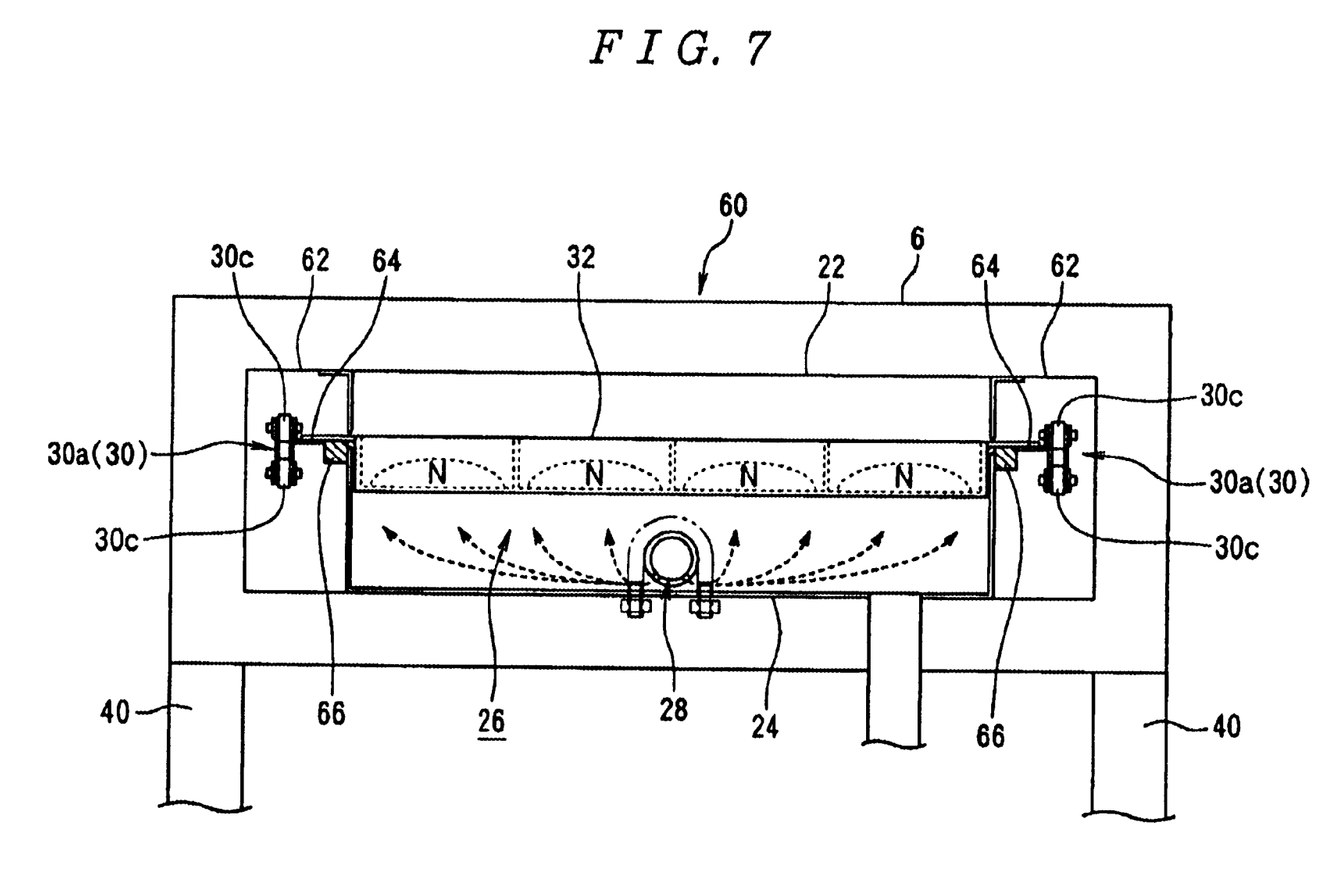
FIG. 7 is a sectional view showing the noodle gelatinization apparatus according to a third embodiment.

FIG. 7 is a sectional view showing the instant-noodle gelatinization apparatus according to a third embodiment.

This embodiment is a flat gelatinization apparatus 60 similar to that of the first embodiment. The same components as those of the first and second embodiments are denoted by the same reference numerals and description thereof are omitted.

In the gelatinization apparatus 60 according to this embodiment, a steam chamber 26 extending horizontally is formed by an upper cover 22 and lower cover 24 and delivery chain segments 30a which move along the steam chamber are covered by a chain cover 62 that continues from the sides of the upper cover 22 and lower cover 24. The entire steam chamber 26 is covered by an outer cover 62 supported by an equipment frame 40.

Each basket 32 is connected directly to a designated roller 30c in the delivery chain segments 30a via couplers 64 connected to both longitudinal ends of the basket.

In the delivery chain segments 30a, basket support rails 66 are laid to support the longitudinal ends of the baskets 32 from below. The basket support rails 66 also serve to plug the gaps between the ends of the basket 32 and lower cover 24 from outside.

According to the gelatinization apparatus 60 with the above configuration, when the basket 32 containing noodle strings is carried into the steam chamber 26 by the delivery chain segments 30a, not all the rollers 30c are supported by the delivery chain segments 30a, and both longitudinal ends of the basket 32 are supported from below by the basket support rails 66. Consequently, the rollers 30c other than the roller 30c connected to the basket 32 via the couplers 64 sag below, decreasing the conveying speed of the baskets 32 in the steam chamber 26.

The baskets 32 in the steam chamber 26 move toward the exit side of the steam chamber 26, being pushed by the baskets 32 carried into the steam chamber 26 one after another.

Consequently, the baskets 32 in the steam chamber 26 are carried one behind another without a gap between the baskets 32 adjoining each other by means of a simple mechanism, and thus the steam supplied from the lower part of the steam chamber 26 passes through the bottom of each basket 32 and moves upward, coming into contact with the entire surfaces of the noodle strings N.

The basket support rails 66, which plug the gaps between the ends of the baskets 32 and lower cover 24 from outside, can prevent the steam supplied from the steam pipe 28 from escaping outside from the steam chamber 26 and thus save the amount of steam supply. Therefore, this embodiment also can suppress steam consumption, resulting in low running and equipment costs.

Industrial Applicability

According to the noodle gelatinization apparatus, the baskets entering the steam chamber from the entrance side of the steam chamber move toward the exit side of the steam chamber, being pushed by the baskets carried into the steam chamber subsequently, with the hangers at both ends of the basket being supported from below by the hanger support rails and with the delivery chain segments other than the part connected to the hangers sagging below, the baskets in the steam chamber are carried one behind another without a gap between adjacent baskets. Consequently, the steam supplied from the lower part of the steam chamber passes through the bottom of each basket and moves upward, coming into contact with the entire surfaces of the noodle strings. This reduces the steaming process time and suppresses steam consumption, resulting in low running and equipment costs.

Besides, since each basket is a rectangular box partitioned into a plurality of container compartments with a large number of holes in the bottom and each container compartment contains one serving of noodle strings, the contact areas between individual noodle strings are reduced, making it easier for steam to contact the noodle strings. Consequently, the steaming process can be performed at a high level of quality in a short period of time.

Also, since the delivery lane of the chain conveyor winds up and down from the entrance side to the exit side within the steam chamber, providing a long steaming process line in a limited space, the steaming process can be performed at a high level of quality.

Furthermore, since the baskets entering the steam chamber from the entrance side of the steam chamber move toward the exit side of the steam chamber, being pushed by the baskets carried into the steam chamber subsequently and being supported at both ends from below by the hanger support rails, with the delivery chain segments other than the part connected to the hangers sagging below, the baskets in the steam chamber are carried one behind another without a gap between adjacent baskets.

What is claimed is:

1. A noodle gelatinization apparatus which holds a plurality of baskets such that the baskets freely swing, by hanging both their ends on hangers on chain conveyor rollers placed at designated intervals, lays a delivery lane of said chain conveyor in a steam chamber where steam is supplied from a lower part, and passes the baskets through the steam chamber after loading them with noodle strings near an entrance side of said steam chamber, to run a steaming process of said noodle strings, wherein:

each of said baskets is a box-shaped body partitioned into a plurality of container compartments with a large number of holes, each container compartment being capable of containing one serving of said noodle strings, and hanger support rails are installed spanning between the entrance side and an exit side of said steam chamber; and the basket entering said steam chamber from the entrance side moves toward the exit side, being pushed by succeeding baskets and the hangers at both ends being supported by said hanger support rails, with the chains along said delivery lane which are connected to said hangers sagging below.

2. The noodle gelatinization apparatus according to claim 1, wherein the delivery lane of said chain conveyor winds up and down from said entrance side to said exit side within said steam chamber.

3. A noodle gelatinization apparatus which holds a plurality of baskets by hanging both their ends on the chain conveyor rollers of a chain conveyor and placed at designated intervals, lays a delivery lane of said chain conveyor in a steam chamber where steam is supplied from a lower part, and passes the baskets through the steam chamber after loading them with noodle strings near an entrance side of said steam chamber, to run a steaming process of said noodle strings, wherein:

each of said baskets is a box-shaped body partitioned into a plurality of container compartments with a large number of holes, each container compartment being capable of containing one serving of said noodle strings, and hanger support rails are installed spanning between the entrance side and an exit side of said steam chamber; and the basket entering said steam chamber from the entrance side moves toward the exit side, being pushed by succeeding baskets and being supported at both ends by said hanger support rails, with the chains along said delivery lane sagging below.

* * * * *